June 24, 1930.  T. J. SMULSKI  1,767,818
CAN CAPPING MECHANISM
Filed March 13, 1924  11 Sheets-Sheet 2

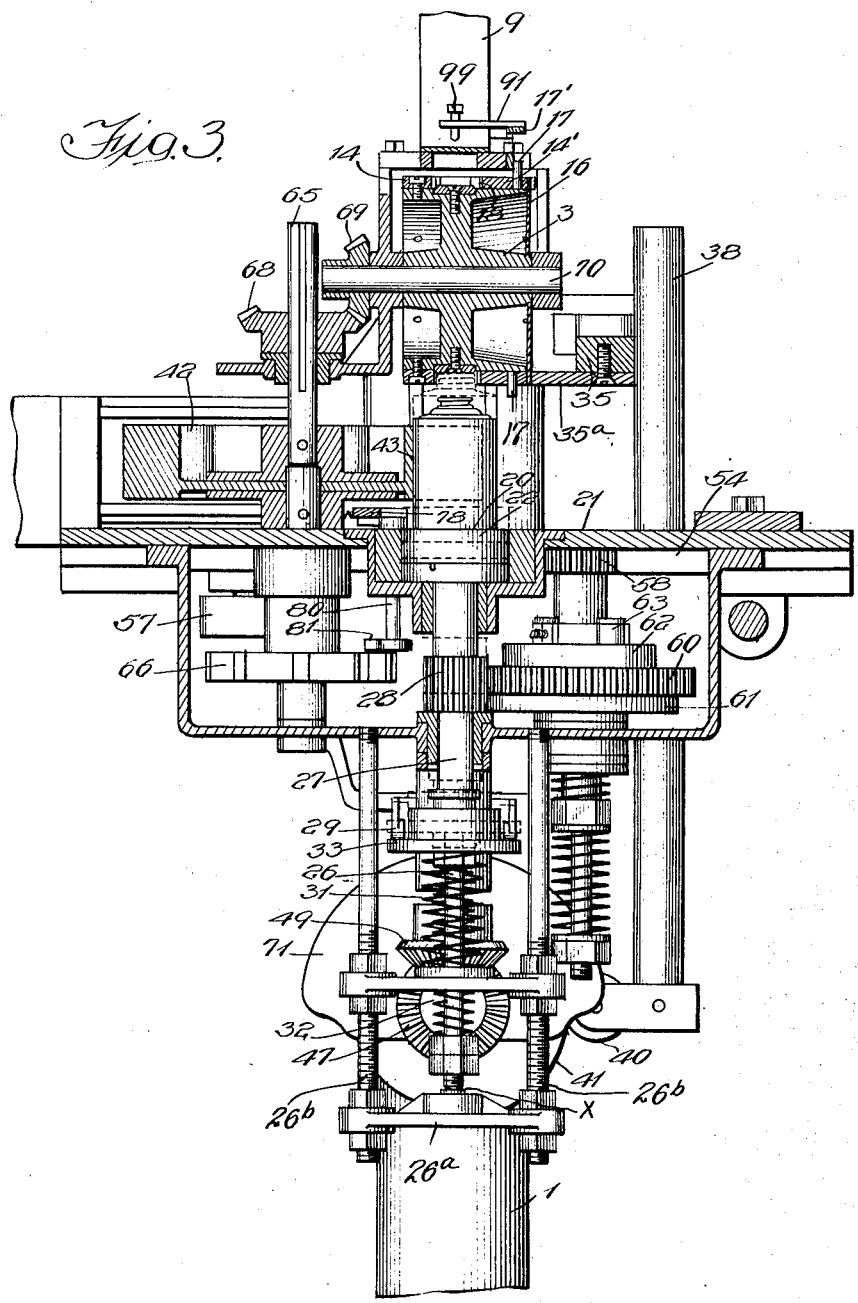

June 24, 1930.  T. J. SMULSKI  1,767,818
CAN CAPPING MECHANISM
Filed March 13, 1924   11 Sheets-Sheet 4
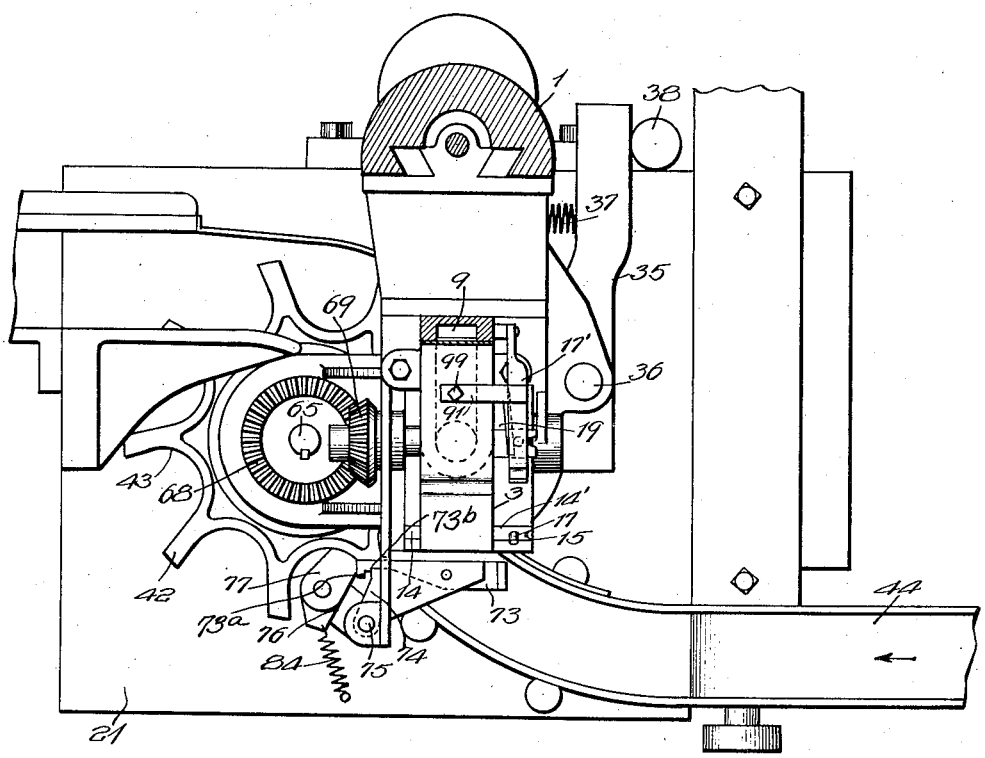
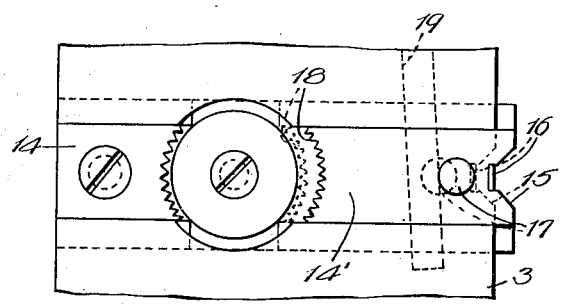
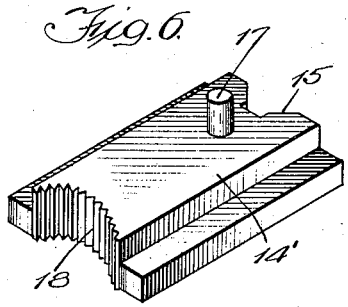
Witnesses:
W. F. Kilroy
Harry E. White
Inventor:
Theodore J. Smulski

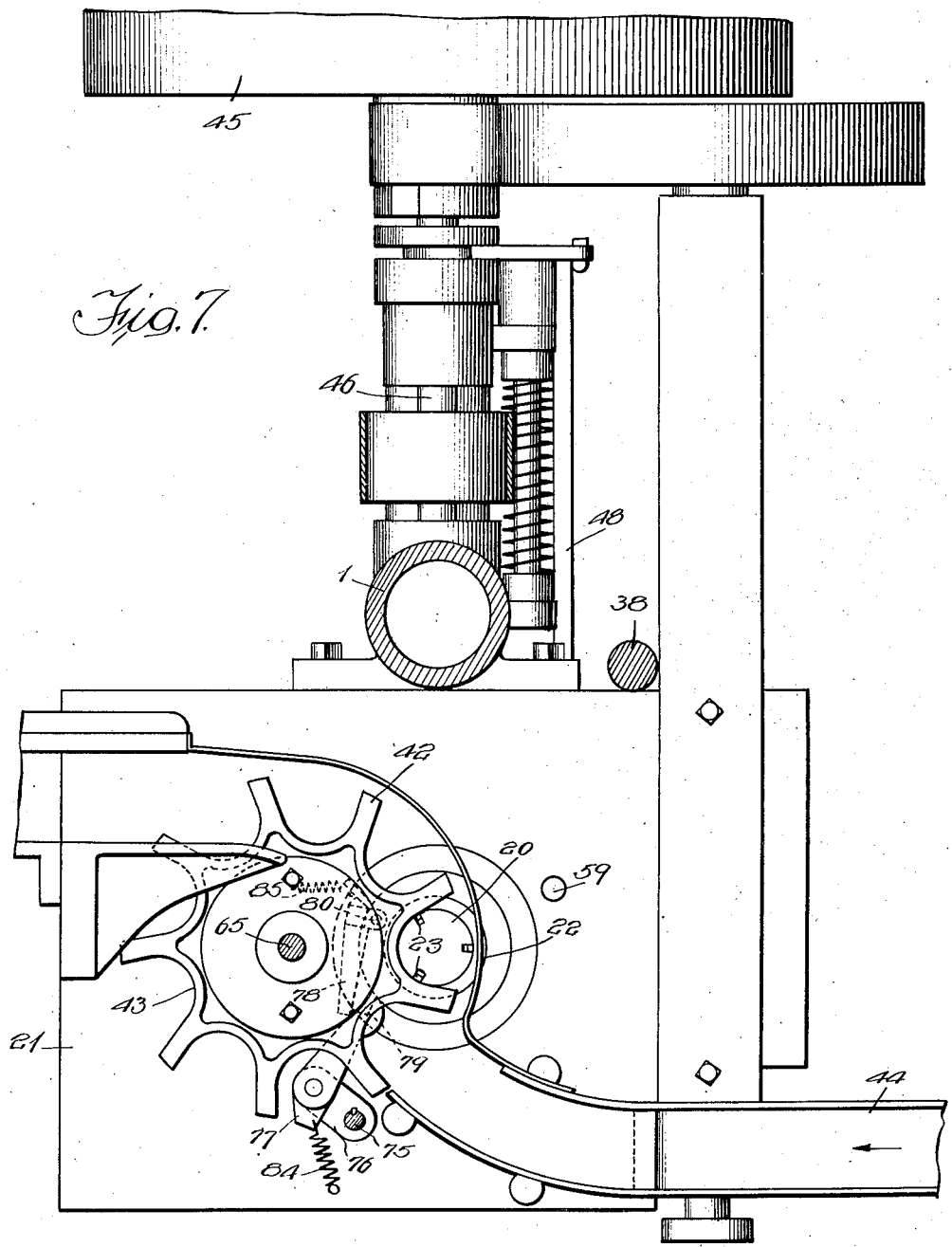

June 24, 1930.  T. J. SMULSKI  1,767,818
CAN CAPPING MECHANISM
Filed March 13, 1924   11 Sheets-Sheet 6
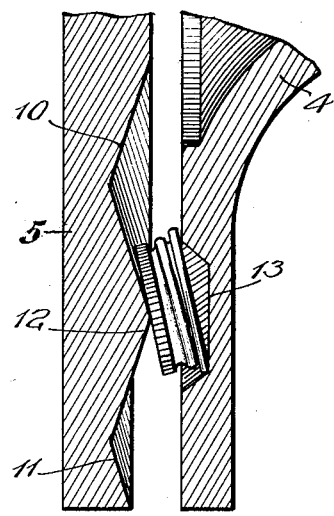
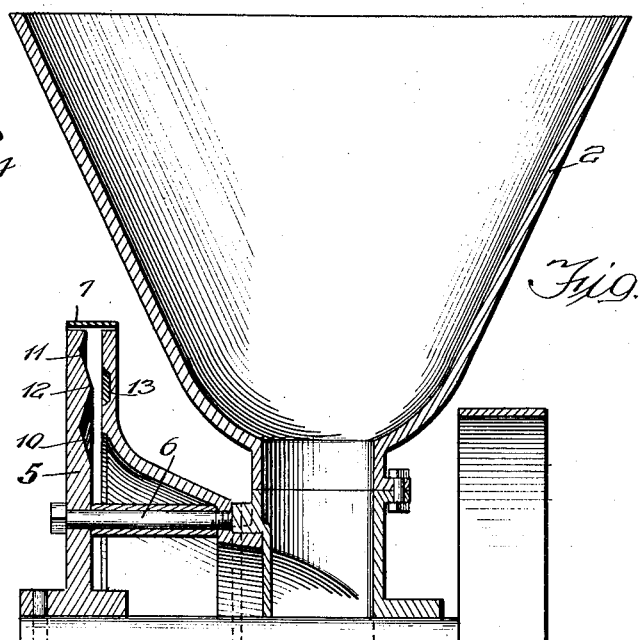
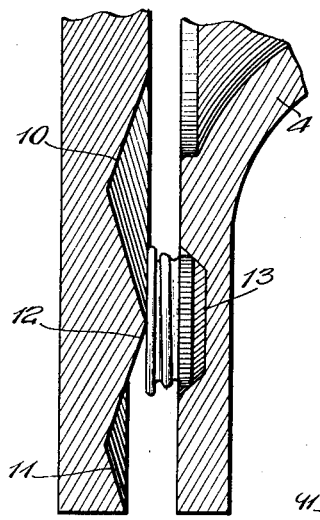
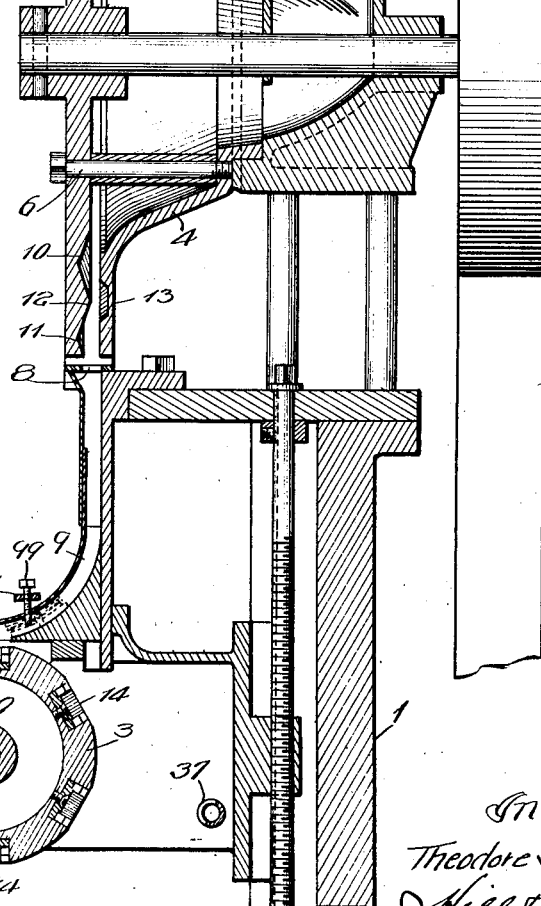

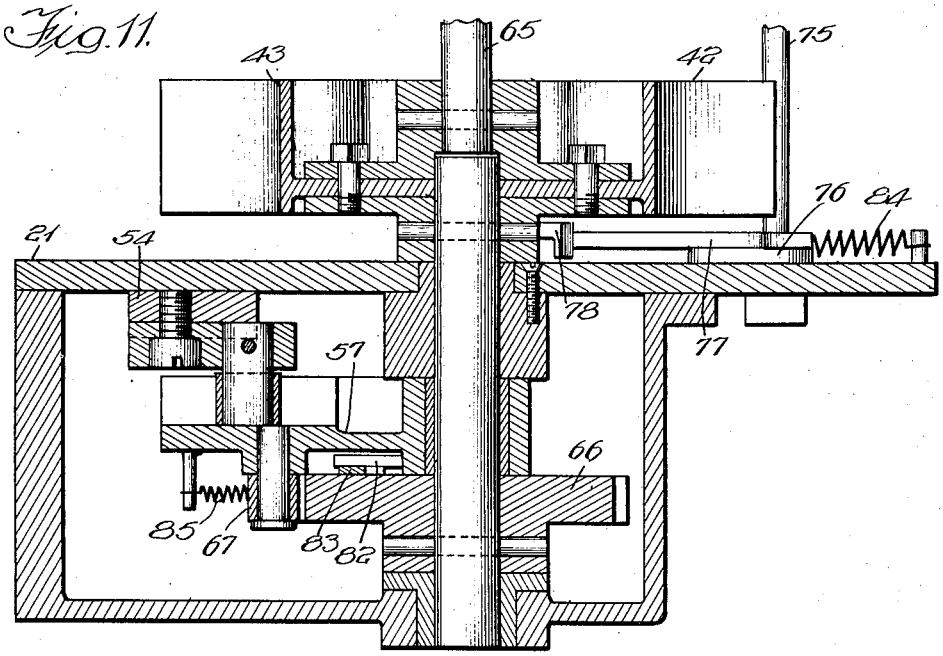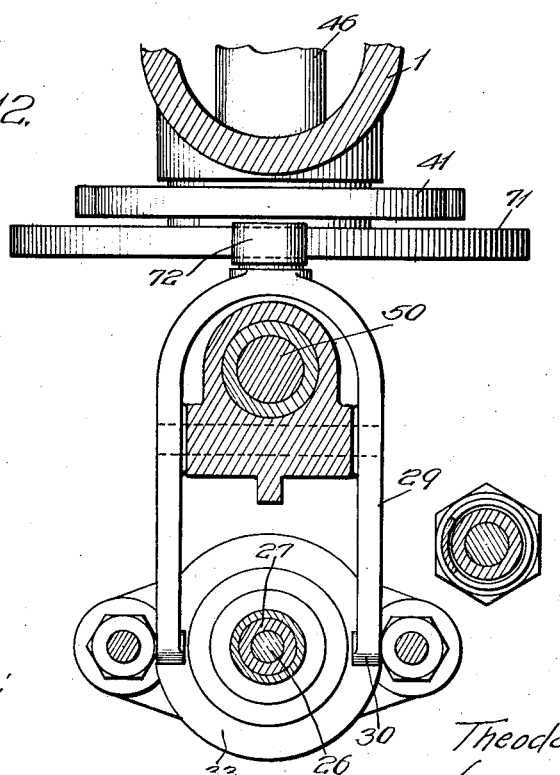

June 24, 1930.    T. J. SMULSKI    1,767,818
CAN CAPPING MECHANISM
Filed March 13, 1924    11 Sheets-Sheet 8

Witnesses:
W. F. Kilroy
Harry E. L. White

Inventor:
Theodore J. Smulski
By Nice & Nice
Attys.

Inventor: Theodore J. Smulski

June 24, 1930.  T. J. SMULSKI  1,767,818
CAN CAPPING MECHANISM
Filed March 13, 1924   11 Sheets-Sheet 10

Witnesses:
W. F. Kilroy
Harry W. L. White

Inventor:
Theodore J. Smulski
By
Attys.

June 24, 1930.  T. J. SMULSKI  1,767,818
CAN CAPPING MECHANISM
Filed March 13, 1924   11 Sheets-Sheet 11
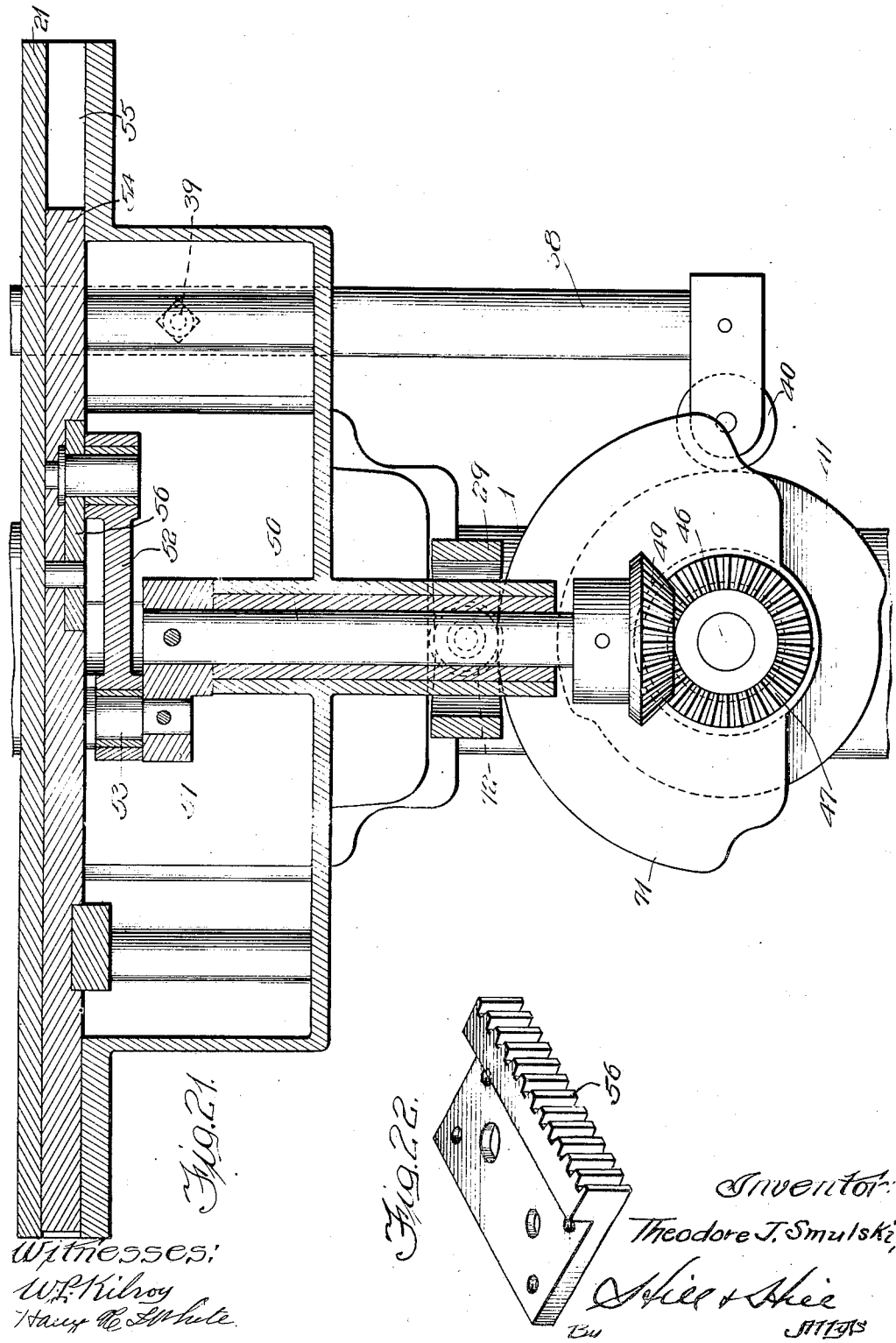

Patented June 24, 1930

1,767,818

UNITED STATES PATENT OFFICE

THEODORE J. SMULSKI, OF LAKE ZURICH, ILLINOIS, ASSIGNOR TO THE ANDERSON CO., OF GARY, INDIANA, A CORPORATION OF INDIANA

CAN-CAPPING MECHANISM

Application filed March 13, 1924. Serial No. 698,943.

My invention relates to an improvement in can capping mechanisms, and has for its object the production of a device of the kind described, which shall be simple, convenient, compact, durable, reliable, efficient and satisfactory for use wherever found applicable.

One of the objects of my invention is to hold a cap fixed while screwing a can thereto and to provide means for feeding the cans and caps into registry with one another continuously.

Another object of my invention is to provide safety means, whereby the mechanism becomes temporarily inoperative when there is no can or cap to be brought into registry with one another.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 3 is a section taken substantially on line 3—3 of Fig. 2;

Fig. 4 is a section taken substantially on line 4—4 of Fig. 1;

Fig. 5 is a fragmentary plan view of the cap-feeding wheel;

Fig. 6 is a perspective view of a detail of the same;

Fig. 7 is a section taken substantially on line 7—7 of Fig. 1;

Fig. 8 is a section taken substantially on line 8—8 of Fig. 1;

Fig. 9 is a fragmentary section of the cap-receiving drum showing the manner of preventing the discharge of caps therethrough in a wrong position;

Fig. 10 is a section similar to that shown in Fig. 9, but with the cap in the correct position for discharge therethorugh;

Fig. 11 is a section taken substantially on line 11—11 of Fig. 1;

Fig. 12 is a section taken substantially on line 12—12 of Fig. 1;

Fig. 21 is a section taken substantially on line 21—21 of Fig. 2; and

Fig. 22 is a perspective detail of the rack for transmitting drive to the can-holding chuck mechanism.

Figure 1:
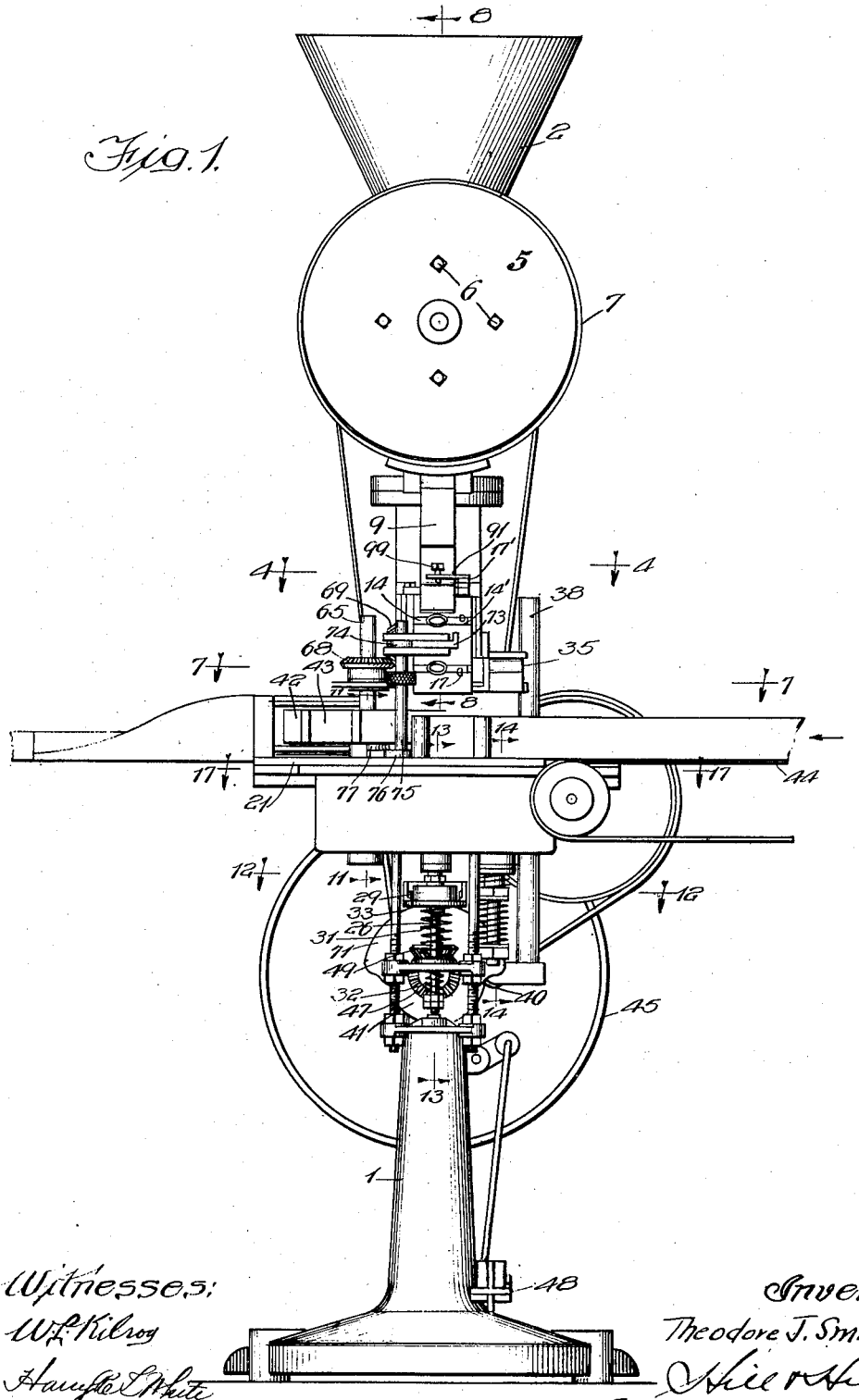
Fig. 1 is a front elevation of the device.

In the drawings, wherein I have illustrated the preferred embodiment of my invention, 1 indicates a suitable framework or standard for supporting the various parts of the device. At one end of the frame a hopper 2 is arranged and into which the supply of caps are thrown, this hopper acting as a supply reservoir and from which the caps are to be fed singly and successively to a feed-wheel 3 arranged therebelow.

In order that the caps may be fed to the feed-wheel 3 in a predetermined position, which, in this instance means with the open ends of the caps arranged upwardly as they fall into position into the feed-wheel 3, there is provided a pair of interconnected rotary disks 4 and 5, (Fig. 8) respectively, these disks interconnected by means of bolts 6, or the like, and mounted adjacent the hopper 2 so as to receive the supply of screw caps therefrom. The disks are spaced apart throughout to form a hollow drum and a rim member 7 is fixed in position to encircle the peripheries of the disks and spaced slightly therefrom, said rim having a discharge opening 8 through its bottom end (discharge opening may be anywhere in the lower half of rim member 7), this passage communicating with a chute 9 terminating at a point vertically above the rotational axis of the feed-wheel 3 (see Fig. 8).

The outermost disk 5 is formed with a pair of annular grooves 10 and 11 therein, the adjacent side walls of said grooves forming an apex 12. A shallow channel or groove 13 is formed annularly in the opposing face of the disk 4, said groove being positioned intermediate the grooves 10 and 11, the width of this groove being such that the groove will receive the closed or small end of the cap, as shown in Fig. 10, but will not receive the large end of the cap as shown in Fig. 9.

The operation of feeding disks is as follows:

The caps are fed promiscuously into the hopper, entering the space between the disks and falling between the opposing grooves. If the cap is in the correct position so that it will assume the desired position suitable for insertion into the feed-wheel 3, that is, in the position shown in Fig. 10, it will discharge through the opening 8 and through the chute 9. On the other hand, if the cap is not in the correct position, as shown in Fig. 9, the cap will not be discharged between the grooves, but will be carried upwardly around until it will fall back into the chamber between the disks and again reenter the space between the opposed grooves and perhaps assume the correct position therein. In other words, only those caps that fall into the correct position between the grooves will be discharged through the opening 8, while the other caps will be thrown back into the chamber so as to again enter the grooves, these operations continuing until all of the caps have been discharged in the correct position.

The feed-wheel 3 is provided with a plurality of circumferentially spaced recesses across its periphery, there being six recesses shown in the particular embodiment shown, and into each of these recesses are adapted to be arranged pairs of jaws 14 and 14'; one of the jaws, as for instance the jaw 14, may be rigid, while the other jaw 14' is slidable.

The outer ends of the slidable jaw members 14' are notched as at 15. Springs 16 fit into these notches, as shown more particularly in Fig. 5. A pin 17 is arranged on each of the jaw members 14' so as to limit their movement toward the member 14.

The caps are fed from the chute 9 with their open ends uppermost and drop into the opening between the opposed jaws 14 and 14', the inner ends of the jaws being roughened or corrugated, as indicated at 18. In order to insure that the jaws shall be spread apart sufficiently to permit the caps to drop into place, a cam 19 is fixed in place to successively engage against the uppermost pin 17 and move the jaw member 14' outwardly against the tension of the spring 16.

An escapement lever 17' is preferably provided for controlling the flow of caps, or to time the caps. (See Figs. 4 and 8.) As shown 17' is an arm or lever pivoted at one end and constructed with the opposite end adapted to cooperate with the pins 17. Lever 17' is provided with an arm 91, having an adjustable pin 99 arranged to engage the caps in the chute 9.

In operation: When cap feed-wheel 3 turns and is about midway of its travel, the pin 17 raises the lever 17' and pin 99 successively releases the caps. The caps slide down and stop against a blank face of feed-wheel 3. Continued rotation of feed-wheel permits the lever 17' to lower and pin 99 to enter next cap stopping it and the rest of the caps that follow. Still further rotation of feed-wheel 3 will present a recess into which the cap that was against the blank face of feed-wheel 3 will fall in, to be clamped and carried step by step into registry with platform 20.

The feed-wheel 3 is rotated in a step by step movement, that is, the wheel 3 is given a rotation through the distance between the adjacent jaws so as to always present a cap-receiving recess into registry below the discharge end of the chute 9. The drive for obtaining this intermittent movement of the feed-wheel will be more clearly hereinafter described.

Figure 13:
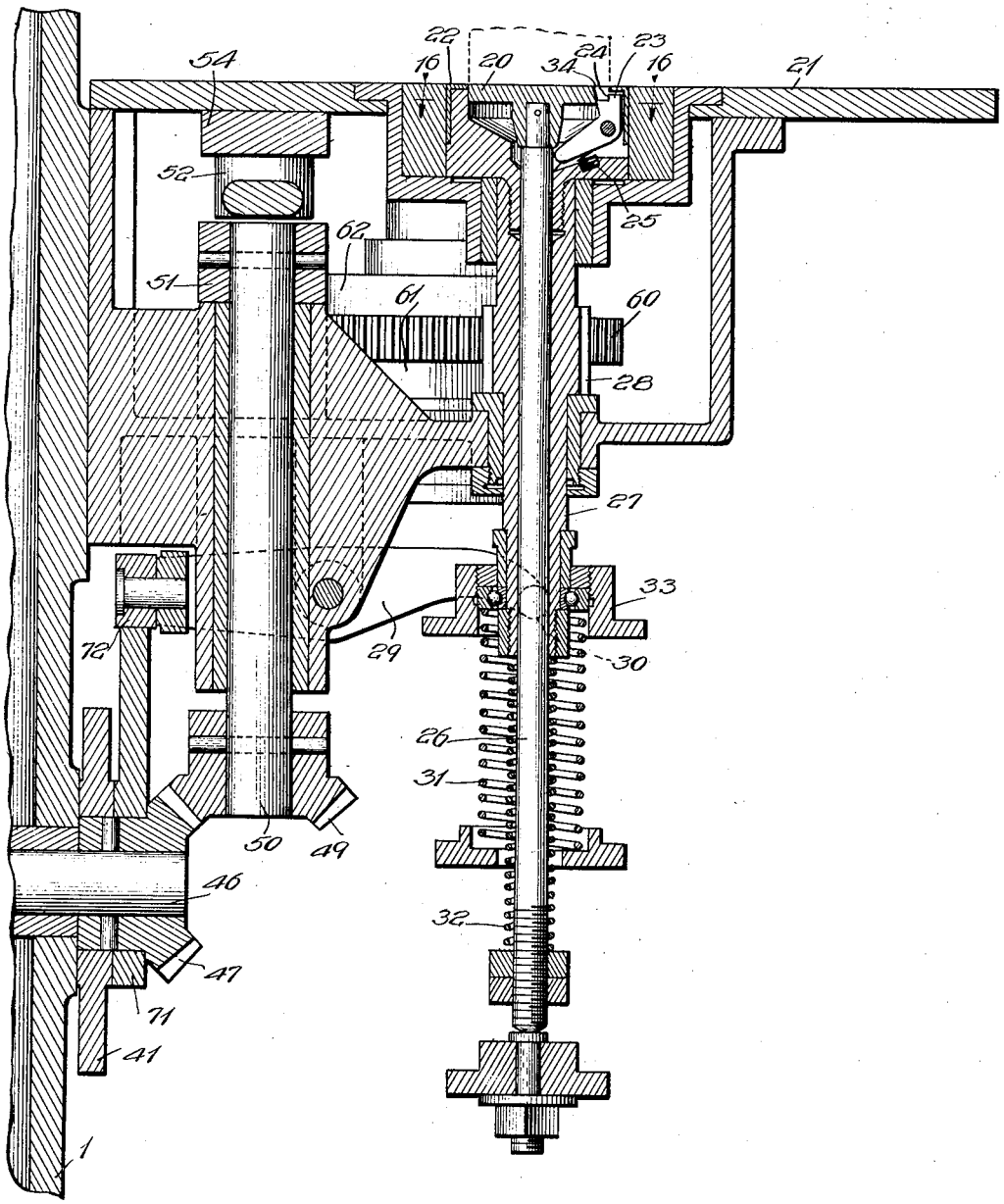
Fig. 13 is a section taken substantially on line 13—13 of Fig. 1.

The cans are fed across a table arranged beneath the feed-wheel, this table having a can-receiving platform 20 vertically below the axis of the wheel 3, as shown. Referring to Figs. 3 and 13, it will be noted that the top of the platform 20 is normally flush with the top of the table 21. The platform 20 seats within a cup member or chuck 22 and pivotally arranged in the recess in the cup member 22 are a plurality of gripping dogs 23 having shouldered upper ends 24. Springs 25 normally keep the dogs in their inoperative position. A shaft 26 is connected at its upper end to the platform 20. A sleeve 27 surrounds the shaft 26, the upper end of the sleeve being connected to the part 22 so as to move together therewith. A gear 28 is carried by the sleeve so as to actuate the same in a manner to be hereinafter described.

The lever 29 preferably forked as shown more clearly in Fig. 12 is pivoted to the frame, one end which is indicated at 30 engages against the flange on opposite sides of the collar 33 carried by the sleeve 27 and the other end carries a roller 72 which engages against the cam 71. The spring 31 tends to lift the sleeve 27 upwardly and the lever 29 lowers and holds the sleeve 27 so that the upper face of the chuck 22 is level with the upper face of the table 21.

Assuming that there is a can in position on the platform 20 and that there is a cap arranged in the lower-most recess of the feed-wheel 3, then by continued rotation of the cam 71 the lever 29 is permitted to turn counterclockwise (Fig. 13) and the spring 31 disposed around the shaft 26 is permitted to lift the sleeve 27 upwardly so that the cup 22 is lifted to enclose or chuck the lower portion of the can periphery.

The spring 32 disposed around the shaft 26 holds the platform 20 and shaft 26 down on the anvil marked "X" so that the upper face of the platform 20 is level with the upper face of the table 21. The anvil marked "X" is fixed in a bracket member 26ª which is adjustably mounted upon rods 26ᵇ depending from a part of the framework or standard 1. While the cup 22 with gripping dogs 23 lifts upwardly to chuck the can, the platform 20 stands stationary until the inner end of the dogs 23 will engage against the inner end of platform 20 and be pivoted radially inwardly so that the shoulders 24 will clamp against the lower or bottom edge of the can. Spring 31 will continue lifting the sleeve 27 with platform 20 and can clamped in place into registry and engagement with the cap, and upon rotation of gear 28 the can is screwed into the cap until the cap is fully seated, whereupon the cam 71 through lever 29 will lower the sleeve 27 with assembled product freeing it first from the jaws 14—14' and second the gripping dogs and cup. Recesses 34 are provided through the platform 20 so that the dogs may travel therethrough.

In order to insure that the cap will not rotate together with the can in the assembling operation above mentioned, auxiliary tension means are provided to clamp the jaws against the cap, before the gear 28 begins to rotate, to hold them clamped through the assembling operation and to release the jaws again before the assembled product is being lowered to facilitate its removal. These means act only on the lower-most jaws.

Figure 2:
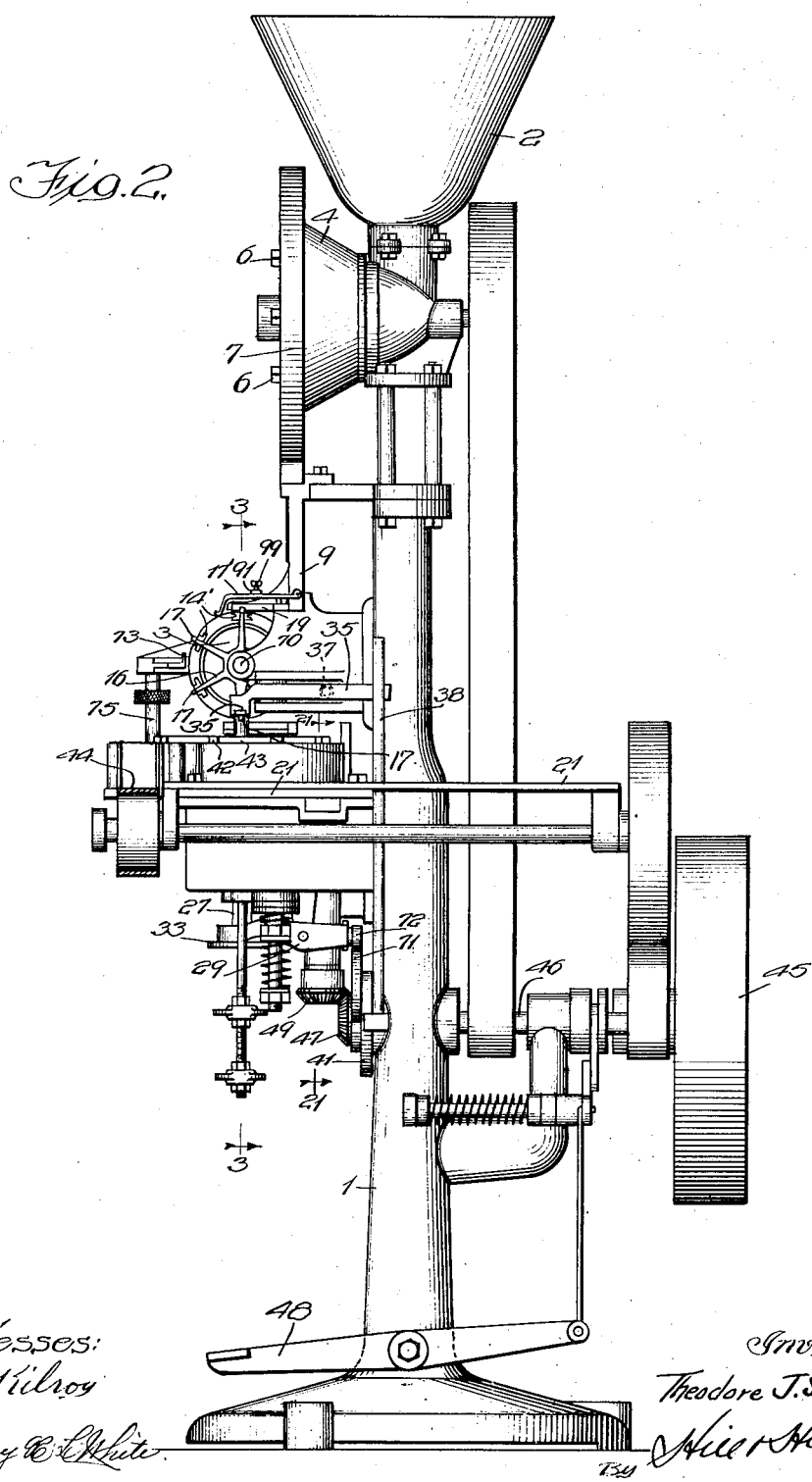
Fig. 2 is a side elevation of the same.

A lever 35 (see Figs. 2 and 4) is pivotally mounted as at 36 and a spring 37 is interposed between the lever and a stationary part of the mechanism to press the opposite end of the lever inwardly against the movable jaw member 14'. The jaw-engaging end of the lever 35 is preferably provided with a tooth 35ª that engages in the notch 15 pressing the jaw toward the stationary jaw and in addition serves to center the same and keep it in accurate registry with the can platform. A rod 38 is pivoted intermediate its ends at 39 (see Fig. 21), the upper end of said rod engaging with the free end of the lever 35 so as to pivotally move the same against the tension of the spring 37 and release the lever from the notch 15, the lower end of the lever carrying a roller 40 riding on a cam 41 which is mounted on a drive shaft 46 journaled in the standard 1. This cam is so designed and proportioned that the lever 38 will be pivotally moved only when it is desired to actuate the lever 35.

A star wheel 42 having a number of can-receiving openings 43 therein is rotatably arranged on the table 21 and operates with a can-feeding conveyor 44. As the cans are fed along the conveyor 44 onto the table 21, the star wheel is given a partial revolution through a predetermined distance to engage the next successive can and bring it onto the rotatable platform 20. The star wheel and feed wheel must be geared together so that they will move in unison, or, in other words, so that the star wheel will center a new can whenever the feed wheel presents a new cap in registry with the rotatable platform.

A drive pulley 45 is mounted on the frame upon the drive shaft 46 carrying a bevelled gear 47 at its other end. A foot pedal 48 is arranged to cooperate with the shaft 46 so as to permit one full revolution thereof each time the foot pedal is operated. A bevelled gear 49 meshes with the gear 47 and is carried on a shaft 50, the upper end of said shaft carrying a crank arm 51. A connecting rod 52 is pivotally connected at one end of the crank arm 51, as at 53, the other end of said connecting rod being pivotally secured to a slidable bar 54. The bar 54 is mounted so as to be moved back and forth or reciprocated through a guideway 55 in the framework.

Figure 14:
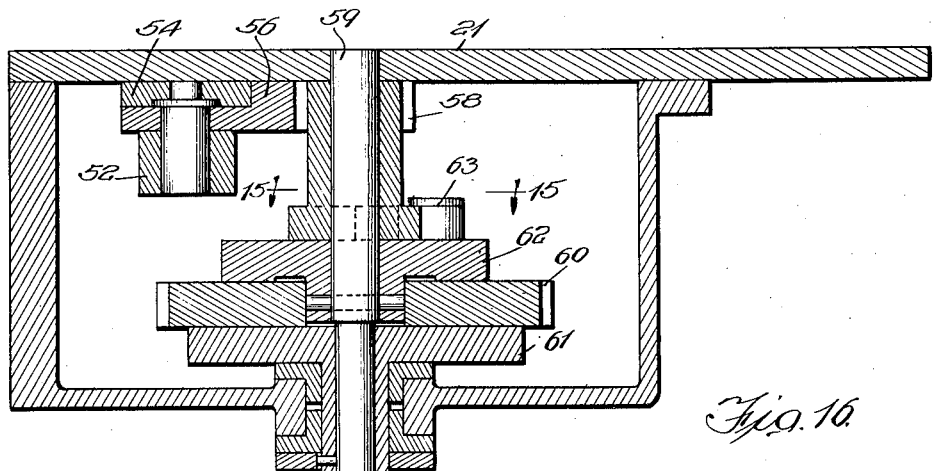
Fig. 14 is a section taken substantially on line 14—14 of Fig. 1.
Figure 16:
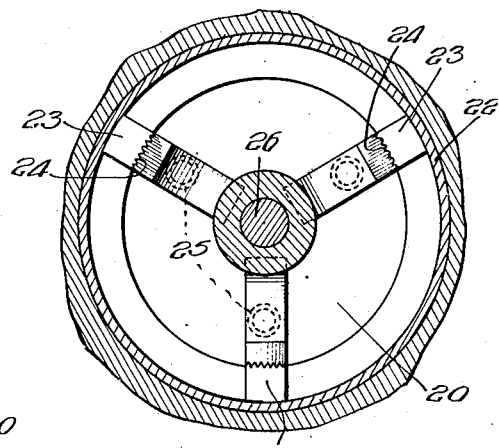
Fig. 16 is a section taken substantially on line 16—16 of Fig. 13.
Figure 15:
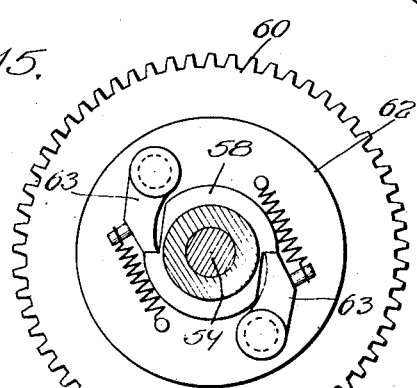
Fig. 15 is a section taken substantially on line 15—15 of Fig. 14.
Figure 17:
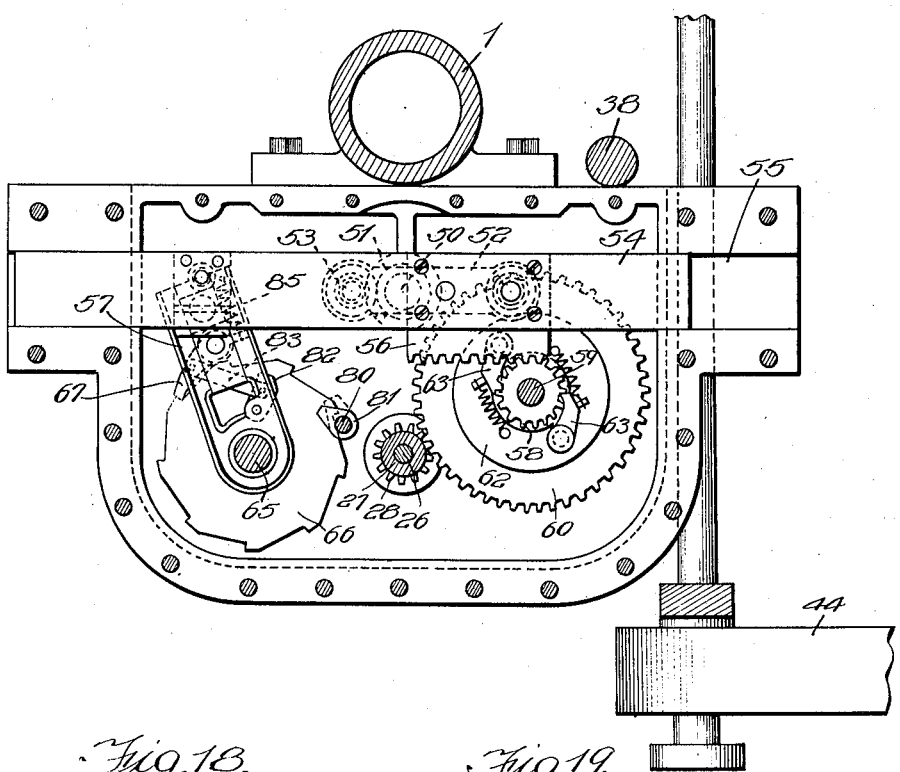
Fig. 17 is a section taken substantially on line 17—17 of Fig. 1.
Figure 18:
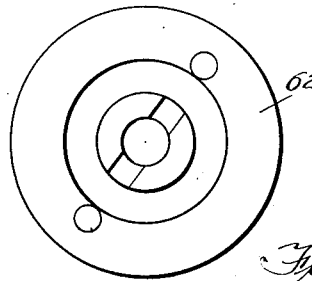
Figs. 18 and 19 are plan views of parts of the drive-transmitting elements for the can-rotating chuck.
Figure 19:
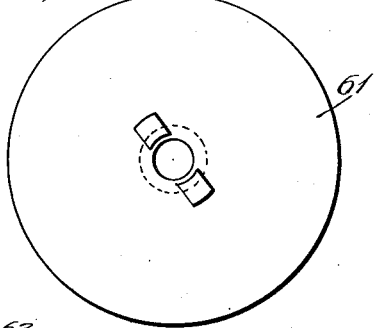
Figure 20:
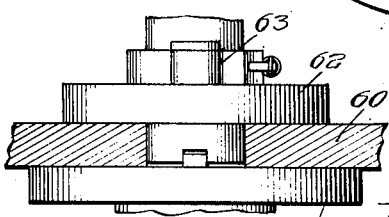
Fig. 20 is a fragmentary elevation showing said parts in assembly.

A toothed rack 56 is carried by the slidable bar 54 and this bar is also pivotally connected to one end of a connecting rod 57. The rack 56 meshes with a gear 58 loose on a shaft 59. A gear 60 is frictionally held between a pair of spring-pressed plates 61 and 62 arranged on the shaft 59 (see Fig. 14) and spring-pressed pawls 63 are carried on one of the plates, as for instance 62, to operatively engage in the hub of the gear 58 so as to transmit the drive between the rack and the gear 60 only in one direction of movement of the rack. As shown in Fig. 17, when the rack is moved to the right it will engage the gear 58 and transmit this movement through the pawls 63 and the friction plates 62 and 61 to the gear 60, the gear 60 meshing with a gear 28 carried on the sleeve 27. When the slidable bar 54 is moved in the opposite direction, that is to the left, the rack 56, although it is in mesh with the gear 58, will not transmit any movement to the gear 60 because the pawl 63 will simply ratchet over the hub of the gear.

The star wheel 42 is carried by a shaft 65, the lower end of said shaft having a notched wheel 66 thereon. The connecting rod 57 is pivotally connected at one end to the shaft 65, as shown more clearly in Figs. 11 and 17, and carries a pawl 67 adapted to engage in the notches of the wheel 66. The connecting rod 57 is rotatable on the shaft 65, while the wheel 66 is keyed thereto. Whenever the slidable bar 54 is moved to the left, it will cause the pawl 67 to move the toothed wheel 66 through the distance between two teeth, and when moved to the right the pawl 67 will be moved into position to engage the next tooth upon movement of the bar 54 again to the left.

A bevelled gear 68 is carried at the upper end of the shaft 65 and meshes with a bevelled gear 69 carried by a shaft 70 upon which the feed wheel 3 is mounted. Thus, it is seen that the star wheel 42 is given a step-by-step movement only in one direction and also that the feed wheel 3 is given a step-by-step movement in one direction, thus insuring that the cans and caps will always be brought into registry with one another.

Mounted on the shaft 46 is a cam 71 engaging a roller 72 at the free end of the lever 29 so as to pivot the lever to lower the sleeve 27 with the can that is upon the rotatable platform 20, without interfering with the rotation thereof. Thus it is seen that the cap-holding wheel and the star wheel are drivingly interconnected so as to be moved simultaneously and insure correct registry of the can and cap.

In order to prevent movement of the star wheel and cap wheel, whenever there is no can in position to be next brought into registry with the cap or whenever there is no cap in place to next register with the can platform, I have arranged a lever 73 pivoted intermediate its ends in the framework or standard 1 as shown in Figs. 1 and 4, one end of said member being adapted to be engaged by the pin 17 of the movable jaw member 14' whenever there is no cap in place between the jaws, but passing said lever without engagement therewith when the jaw members have a cap therebetween. The other end of the member 73 is provided with shoulders 73ª and 73ᵇ engageable with a dog 74 keyed to a shaft 75. When the machine is functioning normally and the caps and the cans are being brought into registry in a proper manner the dog 74 is engaged with the shoulder 73ᵇ. When the supply of caps fails, the member 73 is angularly displaced in a clockwise direction (Fig. 4) by one of the pins 17. A spring 84, which is hereinafter described, then rotates the shaft 75 in a counterclockwise direction (Fig. 4), the angle through which the shaft 75 is rotated being limited by the shoulder 73ª which is engaged by the dog 74. A lever 76 is also keyed to the shaft 75 at one end and at its other end is pivotally connected to one end of a pawl 77. The other end of said pawl normally engages against the free end of a second pawl 78 and is cut away to provide a shoulder or notch 79 beyond the point of its contact with the free end of the pawl 78. The other end of the pawl 78 is keyed to a shaft 80 carrying a dog 81 at its lower end (see Figs. 3 and 17), the dog 81 being arranged slightly above the notched wheel 66.

An abutment 82 is carried by the connecting rod 57 and a link 83 is pivotally connected at its ends to the abutment 82 and the pawl 67, respectively. When the dog 81 is in the position shown in dotted lines in Fig. 17 and the bar 54 is moved to the right, the abutment 82 will pass the dog 81 without engagement therewith, and thus permit the pawl 67 to drop into place to be ready to engage the next notch. If the dog 81 is in the position shown in full lines in Fig. 17, then the abutment 82 will engage thereagainst to lift the pawl 67 outwardly beyond the periphery of the notched wheel 66 so that when the slidable bar is again moved to the left the pawl will not move the notched wheel through the distance between adjacent teeth. The aforementioned spring 84 tends to rotate the shaft 75 and the pawl 77 in a counterclockwise direction (Fig. 4) around the axis of rotation of the shaft. A spring 85 connected to the pawl 78 tends to rotate that pawl in a counterclockwise direction (Fig. 7) around the pivotal axis of the shaft 80. The spring 85 is designed to overcome the action of the spring 84, which tends to rotate the pawl 77 in a counterclockwise direction (Fig. 7) around its pivotal axis. When the cap feeding mechanism fails to feed a cap to the capping position, the pin 17 of the jaw 15 entering the capping position engages the right-hand end (Fig. 4) of the lever 73 and disengages the pawl 73 from the shoulder 73ᵇ. The spring 84 then rotates the shaft 75 and the pawl 77 in a counterclockwise direction (Fig. 4) around the axis of the shaft 75. This presents the notch 79 to the pawl 78 so that the pawl 77 will not rotate the pawl 78 and the shaft 80 in a clockwise direction (Fig. 7) to bring the dog 81 out of the path of the abuttment 82.

When a can is fed into place in the star wheel, the pressure upon it will be sufficient to pivot the pawl 77 to the left (see Fig. 7), pivoting the shaft 80 to the right so as to throw the dog 81 into the position shown in dotted lines shown in Fig. 17, so that the abutment 82 will not engage the dog 81 and therefore will permit the step-by-step movement of the notched wheel 66.

The pawls 77 and 78 return to the position shown in Fig. 7 after each feeding movement of the star wheel. In case there should be no can in position to be fed into the star wheel, the pawl 77 will not be moved and will therefore permit the dog 81 to remain in the position shown in full lines in Fig. 17, and thus prevent the engagement of the pawl 67 with the next tooth of the wheel 66.

In case that there is no cap in position to be engaged by a can upon the rotatable platform 20, the lever member 73 will be pivoted to release the dog 74 causing the pawl 77 to be pulled downwardly by the spring 84 so that pawl 77 no longer engages the pawl 78 and therefore permits the dog 81 to remain in the full line position. The pawl 77 in the present instance must be manually reset whenever the supply of caps is restored, although it is possible to provide mechanism to reset this mechanically.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, cap-feeding means comprising a wheel having cap-receiving recesses in its periphery, chuck members carried by said wheel, means for resiliently urging said chuck members into engagement with caps to adjustably clamp them in said recesses, means for actuating said chuck members to enlarge the cap-receiving recesses as caps are fed thereinto, and means for screwing a can to a cap, and means for successively feeding an uncapped can and discharging the capped can.

2. In a device of the kind described and in combination, cap-feeding means comprising a wheel having cap-receiving recesses about its periphery, chuck members adapted to engage with caps to clamp them in said recesses, spring means engaging said chuck members to yieldably hold said caps, means for overcoming the tension of said spring means to enlarge the cap-receiving recesses as caps are fed thereinto, and means for screwing a can to a cap, and means for successively feeding an uncapped can and discharging the capped can.

3. In a device of the kind described and in combination, can-feeding means, cap-feeding means comprising a wheel having an annular series of cap-receiving recesses therein to successively register with said cans, chuck members in each of said recesses one of which is relatively slidable, tension means engagebale with said chuck members to adjustably clamp the caps in place, means for screwing said cans to said caps, auxiliary tension means automatically operable for holding said chucks clamped as the can is first screwed into the cap and then releasing its tension so that the cap may be removed, and automatically operable means for actuating said chuck members against said tension means to enlarge said recesses as caps are fed thereinto.

4. In a device of the kind described and in combination, an intermittently operable cap-feeding means, intermittently operable can-feeding means to bring a can into registry with each cap, a rotary chuck engageable with each registered open can, means for intermittently raising said chuck and automatically operable means for frictionally holding said cap while said rotating chuck is lifted to bring the can into engagement therewith to cap it and then is lowered with the capped can, said can feeding means operable to discharge the capped can and simultaneously bring another cap and can into registry.

5. In a device of the kind described and in combination, cap-holding means, can-holding means, and means for successively screwing said cans to said caps, comprising a reciprocating member, drive means between said member and can-holding means to rotate said can-holding means in a step-by-step movement in one direction to screw the can to the cap, and means for successively feeding said caps and cans simultaneously into registry comprising a rotary shaft, a cap-holding wheel and a can-engaging star wheel operably connected thereto so that both said cap-holding wheel and said star wheel are moved simultaneously, a notched member fixedly carried by said rotary shaft, a pawl actuated by said reciprocable member and operatively engagebale with said notched member in one direction of travel to move it in a step-by-step movement.

6. In a device of the kind described and in combination, cap-holding means, can-holding means, and means for screwing said cans to said caps, a shaft, a carrying wheel for said cap-holding means and a can-engaging star wheel operably connected thereto so that both said carrying wheel and star wheel move simultaneously to bring said caps and cans simultaneously into registry, a notched member fixedly carried by said rotary shaft, a reciprocating driven member, means connecting said reciprocating member and can-holding means, means for intermittently actuating said reciprocating member for bringing a can into engagement with a cap, a pawl actuated by said reciprocable member and operatively engageable in one direction of travel with said notched member to move it in a step-by-step movement, and means to render the pawl inoperative to move the notched member whenever there is no can in position to be next brought into registry with the cap.

7. In a device of the kind described and in combination, cap-holding means, can-holding means, and means for screwing said cans to said caps, comprising a reciprocating member, drive means between said reciprocable member and can-holding means to rotate said can-holding means in a step-by-step movement in one direction, and means for successively feeding said caps and cans simultaneously into registry, comprising a rotary shaft, a carrying wheel for said cap-holding means and a can-engaging star wheel operably connected thereto so that both said carrying wheel and star wheel move simultaneously, means for intermittently actuating said reciprocating member for bringing a can into engagement with a cap, a notched member fixedly carried by said rotary shaft, a pawl actuated by said reciprocable member and operatively engageable in one direction of travel with said notched member to move it in a step-by-step movement, and means to render the pawl inoperative to move the notched member whenever there is no cap in place to be next brought into registry with the centered can.

8. In a device of the kind described and in combination, means for singly feeding caps, means for feeding cans singly into registry with said caps and discharging the capped cans, means for rotating a can upon its longitudinal axis, and means for simultaneously bringing said can and a cap into engagement with each other so as to screw said can to said cap, means for stopping said can-feeding means whenever there is no can in position for feeding into registry with a cap, and common means for actuating said stopping means and each of the other mentioned means.

9. In a device of the kind described and in combination, a hopper, means for feeding caps in succession therefrom, means for feeding cans singly into registry with said caps and discharging the capped cans, means for rotating a can upon its longitudinal axis, and means for simultaneously bringing said can and a cap into engagement with each other so as to screw said can to said cap, means for stopping said cap-feeding means whenever there is no cap in position for feeding into registry with a can, and common means for actuating said stopping means and each of the other mentioned means.

10. In a device of the kind described and in combination, a hopper, means for successively feeding caps and cans into registry with each other, means for rotating a can upon its longitudinal axis, and means for simultaneously bringing said can and a cap into engagement with each other so as to screw said can to said cap, means for arresting movement of both of said feeding means whenever there is no cap or can in position for feeding into registry, and common means for actuating said arresting means and each of the other mentioned means.

11. In a device of the kind described and in combination, a hopper, means for feeding caps singly therefrom, means for feeding cans singly into registry with said caps, a common drive means for controlling both of said feeding means, means for rotating a can upon its longitudinal axis, and means for bringing said can and a cap into engagement so as to screw said registering can and cap together, means for disengaging said drive means whenever there is no can or no cap in position for feeding into registry, and common means for actuating said disengaging means and each of the other mentioned means.

12. In a machine of the kind described, cap feeding mechanism, can feeding mechanism, means for rotating a can upon its longitudinal axis, and means for simultaneously bringing said can and a cap into engagement with each other so as to screw the can to the cap, jaws for holding the caps during the screwing operation, and means controlled by said jaws for rendering said can-feeding mechanism functionally inoperative.

13. In a device of the kind described and in combination, means for singly feeding caps, means for singly feeding cans into registry with said caps and for discharging the capped cans, means for gripping a can at the base thereof when in registry with a cap, means for varying the pressure with which said gripping means will grasp a can, means associated with said gripping means for rotating said can upon its longitudinal axis and simultaneously raising said can into yielding engagement with a cap so as to screw said can to said cap.

14. In a device of the kind described and in combination, means for singly feeding caps, means for singly feeding cans into registry with said caps and for discharging the capped cans, means for gripping a can at the base thereof when in registry with a cap, and means intermittently rotating said can and raising it into engagement with a cap.

15. In a device of the kind described and in combination, means for singly feeding caps, means for singly feeding cans into registry with said caps and for discharging the capped cans, means for rotating said can upon its longitudinal axis and for simultaneously raising said can into engagement with a cap so as to screw said can to said cap, and means for yieldably retaining said cap until it has been engaged by said can and then releasing it.

16. In a device of the kind described and in combination, means for singly feeding caps, means for singly feeding cans into registry with said caps and for discharging the capped cans, means for rotating said can upon its longitudinal axis and for simultaneously raising said can into resilient engagement with a cap so as to screw said can to said cap, and means yieldably retaining said cap until it has been engaged by said can and then releasing it.

17. In a device of the kind described and in combination, cap feeding means, means for feeding and discharging a can, means for actuating said cap feeding means and said can feeding means for successively bringing a cap and a can into registry, means for screwing a can to a cap comprising an intermittently rotatable chuck engageable with the base of a can, and means for lifting and lowering said chuck in a predetermined manner.

18. In a device of the kind described and in combination, cap feeding means, means for feeding and discharging a can, means for actuating said cap feeding means and said can feeding means for successively bringing a cap and a can into registry, means for screwing a can to a cap comprising an intermittently rotatable chuck engageable with the base of a registered can, resilient means for lifting said chucked can into engagement with a cap and means for lowering said capped can.

19. In a device of the kind described and in combination, cap feeding means, means for feeding and discharging a can, means for actuating said cap feeding means and said can feeding means for successively bringing a cap and can into registry, means for screwing a can to a cap comprising an intermittently rotatable chuck engageable with the base of a registered can, means for intermittently rotating said chuck, and a clutch disposed between said chuck and said rotating means.

20. In a device of the kind described and in combination, cap feeding means, means for feeding and discharging a can, means for actuating said cap feeding means and said can feeding means for successively bringing a cap and can into registry, means for screwing a can to a cap comprising an intermittently rotatable chuck engageable with the base of a registered can, means for intermittently rotating said chuck, a clutch disposed between said chuck and said rotating means, and means for rendering inoperative the actuating means for said cap feeding means and said can feeding means whenever there is no cap or no can in position for feeding into registry.

In testimony whereof I have hereunto signed my name.

THEODORE J. SMULSKI.